United States Patent [19]

Garoff

[11] Patent Number: 4,780,439
[45] Date of Patent: Oct. 25, 1988

[54] CATALYST COMPONENT FOR ALPHA OLEFINE-POLYMERIZING CATALYSTS AND PROCEDURE FOR MANUFACTURING THE SAME

[75] Inventor: Thomas Garoff, Helsinki, Finland
[73] Assignee: Neste Oy, Finland
[21] Appl. No.: 34,216
[22] Filed: Apr. 1, 1987
[30] Foreign Application Priority Data Apr. 1, 1986 [FI] Finland ................... 861386

[51] Int. Cl.$^4$ ............................... C08F 4/64
[52] U.S. Cl. ..................... 502/107; 502/119; 502/123; 502/125; 502/126; 502/127; 502/133; 502/134; 526/124; 526/125
[58] Field of Search .............. 502/107, 119, 123, 125, 502/126, 127, 133, 134

[56] References Cited

U.S. PATENT DOCUMENTS

| | | | |
|---|---|---|---|
| 3,953,414 | 4/1976 | Galli et al. | 502/134 X |
| 4,107,415 | 8/1978 | Giannini et al. | 502/125 X |
| 4,226,741 | 10/1980 | Luciani et al. | 502/127 X |
| 4,487,845 | 12/1984 | Triplett | 502/107 |
| 4,529,716 | 7/1985 | Banzi et al. | 502/134 X |
| 4,532,313 | 7/1985 | Matlack | 502/134 X |
| 4,544,717 | 10/1985 | Mayr et al. | 502/127 X |

Primary Examiner—Patrick P. Garvin
Attorney, Agent, or Firm—Steinberg & Raskin

[57] ABSTRACT

A catalyst component for alpha olefine-polymerizing catalysts which comprise an organoaluminum compound, an external electron donor, and a solid catalyst compound obtained when a solid carrier component containing magnesium has reacted with a titanium halide compound, in addition to a procedure for manufacturing the same. The catalyst component is produced by reacting a solid carrier component with a titanium halide compound with or without the presence of an internal electron donor. The solid carrier component is prepared by (a) dissolving, in hydrochloric acid, a magnesium compound selected from the group consisting of magnesium hydroxide, magnesium carbonate, magnesium oxide, and natural and/or synthetic minerals containing the same,
(b) evaporating the solution until dry,
(c) heating the obtained salt mixture at 130° to 150° C.,
(d) dissolving the magnesium component in ethanol,
(e) drying the ethanol solution of the magnesium component with the aid of periodic azeotropic distillation, and
(f) precipitating the solid carrier component from the ethanol solution.

3 Claims, No Drawings

CATALYST COMPONENT FOR ALPHA OLEFINE-POLYMERIZING CATALYSTS AND PROCEDURE FOR MANUFACTURING THE SAME

BACKGROUND OF THE INVENTION

The invention concerns a catalyst component for an alpha olephine-polymerizing catalyst, which comprises an organoaluminum compound, an electron donor, and a solid catalyst component which is obtained when a compound containing magnesium has reacted with a titanium halide compound. The present invention is also directed to a procedure for manufacturing this catalyst component, and to a procedure for polymerizing the alpha olefines, especially propylene, which makes use of the catalyst component.

Catalysts known in the prior art with high activity for polymerizing alpha olefines, which have been manufactured include an aluminum alkyl compound, an electron donor, and a halogenated titanium compound on a carrier substance comprising various magnesium compounds. Chlorinated magnesium compounds have generally been used as the magnesium compound, which may be, for instance, water-free magnesium chloride alone or together with other magnesium ccmpounds, or an organic magnesium compound which has been prepared by halogenating organic magnesium compounds with the aid of chlorine-containing compounds.

In polymerizing catalysts of this type, the properties of the solid carrier component have significant influence upon the properties of the ultimate catalyst, e.g. upon its activity. These properties can be substantially influenced through the mode of manufacturing of the carrier component.

The present invention concerns a catalyst component in which the carrier component has been prepared from compounds containing magnesium which may be natural minerals or synthetic minerals. Magnesium minerals have been used as starting material in preparing inert carrier components for Ziegler-Natta catalysts for the purpose of polymerizing olefines. However, it has turned out to be difficult to manufacture active Ziegler-Natta catalysts from various magnesium compounds and from minerals containing the same, in particular those catalysts for the polymerizing processes of propylene, because in these processes the catalysts are highly sensitive to moisture and to the crystallized water contained in the carrier. Even minimal quantities of crystallized water already significantly reduce the activity of the catalyst.

SUMMARY OF THE INVENTION

Accordingly, it is an object of the present invention to improve polymerizing of olefines, notably propylene.

It is also an object of the present invention to provide a new and improved catalyst component for carrying out the polymerizing of the olefines.

It is a further object to provide a method for manufacturing a catalyst component for use in the polymerizing of olefines.

These and other objects are attained by the present invention which is directed to a catalyst component for an alpha olefine-polymerizing catalyst which comprises an organoaluminum compound, an external electron donor, and a solid catalyst component obtained when a solid carrier component containing magnesium has reacted with a titanium halide compound and which is free of the drawbacks noted above and therefore suitable for use in the polymerizing of the olefines, notably propylene. In particular, the catalyst component (i.e. carrier component) for the alpha olefine polymerizing is prepared by (a) dissolving in hydrochloric acid, a magnesium component selected from the group consisting of magnesium hydroxide, magnesium carbonate, magnesium oxide, and a mineral containing the same, to form a solution thereof, (b) evaporating the thus-formed solution until dry, to leave a salt mixture residue, (c) heating the thus-obtained salt mixture residue to a temperature of about 130°–150° C., (d) adding the thus-heated salt mixture to ethanol, whereby the magnesium component thereof is dissolved, (e) subjecting the thus-obtained ethanol solution to azeotropic distillation to remove crystallized water therefrom, and (f) precipitating the magnesium component from the remaining solution, thereby forming the catalyst component (i.e. solid carrier component). The solid carrier component formed in step (f) is then reacted with a titanium halide, with or without the presence of an internal electron donor, to form a catalyst component which is then combined with the organoaluminum compound and an external electron donor to catalyze the olefine-polymerizing reaction.

The present invention is also directed to a method for manufacturing a catalyst component for an alpha olefine-polymerizing catalyst comprising an organoaluminum compound, an external electron donor, and a solid catalyst component containing magnesium which is obtained when a solid carrier component containing magnesium has reacted with a titanium halide compound. The method of the present invention is characterized by preparing the catalyst (i.e. solid carrier) component by (a) dissolving in hydrochloric acid, a magnesium component selected from the group consisting of magnesium hydroxide, magnesium carbonate, magnesium oxide, and a mineral containing the same, to form a solution thereof, (b) evaporating the thus-iormed solution until dry, to leave a salt mixture residue, (c) heating the thus-obtained salt mixture residue to a temperature of about 130°–150° C., (d) adding the thus-heated salt mixture to ethanol, whereby the magnesium component thereof is dissolved, (e) subjecting the thus-obtained ethanolic solution to azeotropic distillation to remove crystallized water therefrom, and (f) precipitating the magnesium component from the remaining solution, thereby forming the catalyst (i.e. solid carrier) component. The solid carrier component formed in step (f) is then reacted with a titanium halide compound, with or without the presence of an internal electron donor, to form a catalyst component which is then combined with the organoaluminun compound and external electron donor for carrying out the alpha-olefine polymerizing. The present invention is also directed to a method for polymerizing olefins, especially propylene, in which the polymerizing is carried out in the presence of the catalyst component of the present invention.

The catalyst component of the present invention, and the solid carrier component (which is reacted with the titanium halide to form the catalyst component) of the invention provide several important advantages over carrier components containing magnesium which have been prepared by conventional synthesis techniques. For instance, in manufacturing the carrier component, it is possible to use an open reaction vessel. Moreover, because the synthesis is not sensitive to oxygen and moisture, an inert nitrogen atmosphere is not absolutely essential for the synthesis. The carrier component of the present invention is easier and less expensive to manufacture than carriers which are prepared by halogenating an organic carrier component containing magnesium. Hydrochloric acid is the least expensive choice of chlorinating agent. In the manufacturing method of the invention, conventional aqueous solutions of hydrochloric acid may be used, since the crystallized water can be removed quite simply.

Moreover, in manufacturing the carrier component, hydrochloric acid may be used in excess since the hydrochloric acid is easy to remove in the subsequent synthesis step. Another advantage of the catalyst component and method of the present invention, is that any magnesium product which may be generated as a by-product, such as MgOHCl, which impair the properties of the catalyst, efficiently escapes from the catalyst component of the invention.

DESCRIPTION OF THE PREFERRED EMBODIMENTS

Aside from pure magnesium compounds, mixed salts may also be used in the preparation, in accordance with the present invention. Generally, the magnesium compounds used in the invention may be characterized by the formula $(MgCO_3)_x(Mg(OH)_2)_y(H_2O)_z$, where x and y=0-10, and, depending on the values of x and y, z=0-30, provided at least one of x and y is greater than 0. The most common mixed magnesium salt of this type is $4MgCO_3Mg(OH)_2 2H_2O$.

The first step in preparing the carrier component of the present invention is dissolving the magnesium compound in hydrochloric acid. The magnesium compound may be in powder or granular form, but is preferably in aqueous suspension form. Most magnesium compounds may be mixed in water to become a homogeneous suspension. It is advantageous to utilize this type of suspension, since the extremely violent reaction when hydrochloric acid is added, can be controlled. An appropriate quantity of water may be selected between about 5 to 100 ml per g. of Mg compound.

The hydrochloric acid is advantageously added in the form of a concentrated aqueous solution. The magnesium compound is completely dissolved on addition of the hydrochloric acid, when the pH of the suspension has dropped far enough. A quantity of hydrochloric acid is added so that the pH drops to at least pH 3, preferably even down to pH 1. If too little hydrochloric acid is added, then a great part of the magnesium may remain undissolved.

After the magnesium compound has been dissolved in the hydrochloric acid, the solution is evaporated until dry in the following step. At the same time, the excess hydrochloric acid evaporates. After the evaporation process, the hydrochloric acid mixture is slightly heated at 130°–150° C. The heating time required is between about 0.5 and 1.5 hours, most preferably about 1 hour. Too high a temperature causes the magnesium component to decompose into magnesium chloride and hydroxide, whereby the yield is lowered.

After heating, the salt mixture is dissolved in ethanol, whereby the magnesium component suited for use as the carrier is completely dissolved. The undissolved constituents may be separated by means of centrifuging or filtering from the ethanol solution. Any insoluble magnesium compounds produce in calcination, for instance magnesium chloride, can therefore be separated quite simply.

The obtained clear ethanol solution now exclusively contains magnesium component with crystal (crystallized) water. Removal of the crystal (crystallized) water is essential for producing an active catalyst component. In accordance with the invention, the crystal water is removed by distilling, with the aid of periodic azeotropic distillation. During the distillation, an azeotropic mixture of alcohol and water escapes from the solution, whereby new crystal water is transferred to the ethanol solution. By adding new water-free ethanol to the solution and by repeated distillation, total removal of crystal water from the magnesium component is accomplished.

The number of azeotropic distilling runs required depends on the amount of water present in the solution, and on the intended use of the catalyst. preferahly about 1-15 runs are carried out. If the catalyst is intended for use in polymerizing ethylene, fewer runs are needed, for instance about 1 to 5 runs. When manufacturing a carrier component for propylene polymerizing, a nearly water-free carrier component is required, with it having been found that this is achieved if the number of distilling runs is 8 to 15, advantageously 10 to 12. The water content of the carrier component can then be brought down to about 0.3 moles of crystal water, which may be considered the upper limit for propylene-polymerizing catalysts.

After drying out the crystal water, precipitation of the magnesium carrier component is effected by transferring the dried ethanol solution into a cold solvent, whereby the magnesium component will precipitate. Suitable solvents include common organic hydrocarbons used as solvents. Heptane is a highly appropriate solvent, since its boiling point is sufficiently high so that in the titanizing step which is carried out subsequently to formation of the carrier component, titanium has time to react, while on the other hand, the boiling point is low enough to avoid melting of the carrier component in the titanizing step.

When the ethanol solution containing the magnesium component is added into cold heptane, the carrier component is precipitated in finely divided form. After washing and drying, the carrier component is titanized with the aid of titanium tetrachloride, in a matter known in and of itself in the art, for producing the catalyst component.

Titanizing may be accomplished by, for instance, mixing the solid carrier component with a titanium halide compound once or several times. Before, during, or after the titanizing process, the catalyst component may be furthermore treated with the aid of an internal electron donor compound. The titanizing is preferably accomplished in two steps, between which the internal electron donor may be added, which is usually an amine, ether, or ester of this type. A suitable donor is, for instance, diisobutylphthalate, of which the quantity may be about 0.05 to 0.3, most preferably about 0.2 mol/mol Mg.

In the first step, a low temperature is recommended, e.g. below 0° C., preferably below −20° C. The second titanizing step may be carried out at a higher temperature, e.g. at about 85 to 110° C., a reaction time of about 1-1.5 hours being sufficient. The solid reaction product is then separated from the liquid phase and washed with hydrocarbon solvents to remove impurities and derivatives. The catalyst component may be dried in a light vacuum or in nitrogen gas at room temperature, or at slightly elevated temperature, and may be further homogenized by grinding in a ball mill.

The catalyst component of the invention may then be used to polymerize alpha olefins by allowing the component to come into contact with an Al compound and an external compound releasing electrons. As the external compound releasing electrons, amines, ethers, esters (preferably alkyl and arylesters of aromatic carboxylic acids) or silane compounds (alkyl/aryl silanes) may be used, examples of such being, among others, the methyl and ethyl esters of benzoic, toluic and phthalic acids, isobutylesters of phthalic acid, triethoxysilane, etc. The electron donors are compounds which are able to enter into complexes with Al alkyls. The stereo-specificity of the catalyst can be improved with their aid.

The external compound releasing electrons or donor, and the Al alkyl are mixed together, the molar proportion of the compound releasing electrons to the Al compound being about 20 and the Al/Ti molar proportion being between 10 and 300, depending upon the polymerizing system. Polymerizing may be carried out either as a slurry or bulk polymerizing, or in the gas phase.

The catalyst component and the catalyst prepared in accordance with the present invention, may be used to polymerize alpha olefine such as ethylene, propylene, and butylene, by slurry, bulk, and gas phase methods. However, the catalyst component of the invention is especially well suited for use in polymerizing propylene, because the quantity of crystal water in the carrier substance or component is singularly low. As a result, the activity of the catalysts is especially high, particularly regarding polymerizing of propylene.

The present invention will be described in greater detail in the following examples:

EXAMPLE 1

10 g. dolomite ($MgCa(CO_3)_2$) was suspended in 100 ml ethanol and titrated with 17.5 ml conc. hydrochloric acid (38%), whereby the pH of the suspension dropped to pH 1 and a solution was produced. The solution was evaporated until dry, and the residue was calcinated for one hour at 140° C. The salt was poured into 200 ml of ethanol, with mixing. The ethanol solution was centrifuged for 10 min. at 3000 rpm. The clear solution was then poured into a three-necked flask (1 liter), in which the drying of the ethanol/carrier component solution was carried out with azeotropic distillation.

The drying processs consumed 900 ml absolute ethanol (moisture content less than 100 ppm). The distillation took place in a slow nitrogen flow. The dry (moisture content <400 μg $H_2O$/0.1 ml), hot ethanol carrier solution was transferred into cold heptane, in which the carrier component crystallized.

The carrier component was then treated under inert conditions ($N_2$). The carrier component was transferred into cold titanium tetrachloride (400 ml, −20° C.). After the mixture had warmed up to room temperature, 0.2 mol/mol Mg of diisobutylphthalate was added thereto. The mixture was boiled for four hours at 110° C., after which the catalyst component was allowed to settle, and the $TiCl_4$ solution was exchanged for new solution. The solution was boiled for one hour at 110° C. The completed catalyst component was washed with heptane and dried with nitrogen. The yield was 1.2 g, and the catalyst contained: Mg 11.5%, Ti 3.4%, and Cl− 59%.

The carrier component prepared in this manner was applied in propylene polymerizing, by adding into a 2-liter polymerizing reactor, catalyst which had been prepared by mixing triethylaluminum as aluminum alkyl compound and diphenylmethoxysilane as Lewis compound (Al donor mole proportion: 20) in 50 ml heptane, and admixing to this after five minutes, the catalyst carrier component so as to make the Al/Ti molar proportion 200. Polymerizing was carried out under conditions as follows: propylene partial pressure 9.0 bar, hydrogen partial pressure 0.3 bar, temperature 70° C., and polymerizing time 3 hours.

The activity of the catalyst was found to be 3.3 kg PP per g of catalyst in 3 hours.

EXAMPLE 2

10 g brucite $Mg(OH)_2$ was suspended in 100 ml ethanol, and titrated with 20 ml conc. hydrochloric acid (38%), whereby the pH of the suspension dropped to pH 1 and a solution was produced. The solution was evaporated until dry, and the residue was calcinated for one hour at 140° C. The salt was poured into 200 ml ethanol, with mixing. The ethanol solution was centrifuged for 10 min. at 3000 rpm. The clear solution was poured into a three-necked flask (1 liter), in which the drying of the ethanol/carrier component solution was carried out with the aid of azeotropic distillation.

The drying process consumed 1000 ml absolute ethanol (moisture content less than 100 ppm). The distillation took place in a slight nitrogen flow. The dry (moisture content <400 μg $H_2O$/0.1 ml), hot ethanol/carrier component solution was transferred into cold heptane (−20° C.), in which the carrier component crystallized. The carrier component was then processed under inert conditions ($N_2$). The carrier component was transferred into cold titanium tetrachloride 400 ml, −20° C.). After the mixture had warmed up to room temperature, 0.1 mol/mol Mg of diisobutylphthalate was added. The mixture was boiled for 1 hour at 110° C., after which the catalyst was allowed to settled and the $TiCl_4$ solution was exchanged for new solution. The mixture was boiled for one hour at 110° C. The completed catalyst component was washed with heptane and dried with nitrogen. The yield was 1.2 g and the catalyst component contained: Mg 11.0%, Ti 3.9% and Cl− 60.0%.

When the above-prepared catalyst was used to polymerize propylene as in Example 1, its activity was found to be 2.1 kg PP per g of catalyst in 3 hours.

EXAMPLE 3

10 g $Mg(OH)_2$ was suspended in 100 ml water. Conc. hydrochloric acid (38%) was added to the suspension, until the pH was 1. Thereafter, the solution was evaporated until dry, and the dried salt was calcinated slightly for 1 hour at 140° C. The salt was poured, with mixing, into 200 ml ethanol. The ethanol solution was centrifuged for 10 min. at 3000 rpm. The clear solution was poured into a three-necked flask (1 liter), in which the drying of the ethanol/ carrier solution was carried out with azeotropic distillation. The drying process consumed 1200 ml absolute ethanol (moisture content <100 ppm).

The distillation took place in a slow nitrogen flow. The dry (moisture content <400 μg H$_2$O/0.1 ml) hot ethanol/carrier solution was transferred into 500 ml cold heptane, in which the carrier component crystallized. The carrier component was then processed under inert conditions (N$_2$). The carrier component was transferred into 500 ml cold titanium tetrachloride (−20° C.). After the mixture had warmed up to room temperature, 0.2 mol/mol Mg of diisobutylphthalate was added. The mixture was boiled for 1 hour at 110° C., after which the catalyst component was allowed to settle and the TiCl$_4$ solution was exchanged once for new solution. The mixture was washed for 1 hour at 110° C. The completed catalyst component was washed with heptane and dried with nitrogen. The yield was 6.0 g, and the catalyst component contained: Mg 13.5%, Ti 8.0%, and Cl$^-$ 53.0%.

The catalyst was used to polymerize propylene as in Example 1, and its activity was 6.5 kg PP per g of catalyst in 3 hours. The bulk density of the polymer was 0.3 g/ml, and 95% of the particle distribution was in the range of 0.2 to 1.0 mm.

EXAMPLE 4

The catalyst component was prepared as in Example 3, using 10 g 4MgCo$_3$Mg(OH)$_2$4H$_2$O for starting material. The yield of the obtained catalyst component was 12.9 g, and it contained: Mg 14.7%, ti 5.0%, and Cl$^-$ 53.0%. The catalyst component was used for polymerizing propylene as in Example 1, and its activity was 6.8 kg PP per g of catalyst in 3 hours. The bulk density of the polymer was 0.26 g/ml, and 95% of its particle distribution was in the range of 0.2 to 1 mm.

EXAMPLE 5

As in Example 3, a catalyst component was prepared using 10 g MgO as starting material. The yield of the obtained catalyst component was 8.4 g, and upon polymerizing propylene with it, as in Example 1, its activity was found to be 6.97 kg PP per g of catalyst in 3 hours.

The bulk density of the polymer was 0.3 g per ml, and 95% of its particles had a diameter in the range of 0.2 to 1 mm.

The preceding description of the present invention is merely exemplary, and is not intended to limit the scope thereof in any way.

I claim:

1. Method for manufacturing a catalyst component for α-olefine polymerizing catalysts comprising an organoaluminum compound, an external electron donor, and said component, which comprises
   (a) dissolving in hydrochloric acid, a magnesium component selected from the group consisting of magnesium hydroxide, magnesium carbonate, magnesium oxide, and a mineral containing the same, to form a solution thereof,
   (b) evaporating the thus-formed solution until dry, to leave a salt mixture residue,
   (c) heating the thus-obtained salt mixture residue to a temperature of about 130°–150° C.,
   (d) adding the thus-heated salt mixture to ethanol, whereby the magnesium component thereof is dissolved,
   (e) subjecting the thus-obtained ethanolic solution to azeotropic distillation to remove crystallized water therefrom,
   (f) precipating the magnesium component from the remaining solution, thereby forming said catalyst component, and
   (g) reacting the thus-precipitated magnesium component with a titanium halide.

2. The method of claim 1, wherein
   (g) the thus-precipitated magnesium component is reacted with the titanium halide in the presence of an internal electron donor.

3. The method of claim 1, additionally comprising
   (h) separating a solid reaction product of the reaction of the thus-precipitated magnesium component with the titanium halide, washing the solid product, and then drying the same.

* * * * *